(12) United States Patent
Umehara

(10) Patent No.: US 10,707,476 B2
(45) Date of Patent: Jul. 7, 2020

(54) METHOD OF PRODUCING A NEGATIVE ELECTRODE SHEET

(71) Applicant: TOYOTA JIDOSHA KABUSHIKI KAISHA, Toyota-shi, Aichi-ken (JP)

(72) Inventor: Masakazu Umehara, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 16/124,680

(22) Filed: Sep. 7, 2018

(65) Prior Publication Data

US 2019/0088921 A1 Mar. 21, 2019

(30) Foreign Application Priority Data

Sep. 21, 2017 (JP) .................................. 2017-181353

(51) Int. Cl.
*H01M 4/04* (2006.01)
*H01M 4/36* (2006.01)
(Continued)

(52) U.S. Cl.
CPC ....... *H01M 4/0404* (2013.01); *H01M 4/0435* (2013.01); *H01M 4/0471* (2013.01);
(Continued)

(58) Field of Classification Search
CPC ............. H01M 4/0404; H01M 4/0435; H01M 4/0471; H01M 4/133; H01M 4/139;
(Continued)

(56) References Cited

U.S. PATENT DOCUMENTS

| 2009/0111019 | A1 | 4/2009 | Hirose et al. |
| 2012/0246917 | A1* | 10/2012 | Dairen ................ H01M 4/0404 29/731 |
| 2018/0287158 | A1* | 10/2018 | Ma ......................... H01M 4/62 |

FOREIGN PATENT DOCUMENTS

| JP | 09-245793 A | 9/1997 |
| JP | 2009-110845 A | 5/2009 |

(Continued)

OTHER PUBLICATIONS

Henri Groult et al., "Surface-fluorinated graphite anode materials for Li-ion batteries", Journal of Fluorine Chemistry, 2005, vol. 126, pp. 1111-1116. (Year: 2005).*

*Primary Examiner* — Wyatt P McConnell
(74) *Attorney, Agent, or Firm* — Sughrue Mion, PLLC

(57) ABSTRACT

A method of producing a negative electrode sheet includes forming a fluoride coating on surfaces of a plurality of negative electrode active material particles by performing a fluorination treatment on the surfaces of the plurality of negative electrode active material particles; producing a negative electrode composite material containing a plurality of wet granules obtained by mixing and granulating the negative electrode active material particles with the fluoride coating on the surfaces, a binder, and water as a solvent; causing the negative electrode composite material to pass through a gap between two rollers that face each other, compressing the negative electrode composite material into a film, and attaching the film to a surface of a current collector foil; and forming a negative electrode mixture layer on the surface of the current collector foil by drying the film on the surface of the current collector foil.

7 Claims, 8 Drawing Sheets

(51) Int. Cl.
  *H01M 4/583* (2010.01)
  *H01M 4/133* (2010.01)
  *H01M 4/1393* (2010.01)
  *H01M 4/02* (2006.01)

(52) U.S. Cl.
  CPC ......... *H01M 4/133* (2013.01); *H01M 4/1393* (2013.01); *H01M 4/366* (2013.01); *H01M 4/5835* (2013.01); *H01M 2004/027* (2013.01)

(58) Field of Classification Search
  CPC .. H01M 4/1393; H01M 4/1397; H01M 4/366; H01M 4/5835; H01M 2004/027
  See application file for complete search history.

(56) References Cited

FOREIGN PATENT DOCUMENTS

| | | | |
|---|---|---|---|
| JP | 2013-77560 | * | 4/2013 |
| JP | 2013-077560 A | | 4/2013 |
| JP | 2015-201318 A | | 11/2015 |
| JP | 2017-098155 A | | 6/2017 |

* cited by examiner

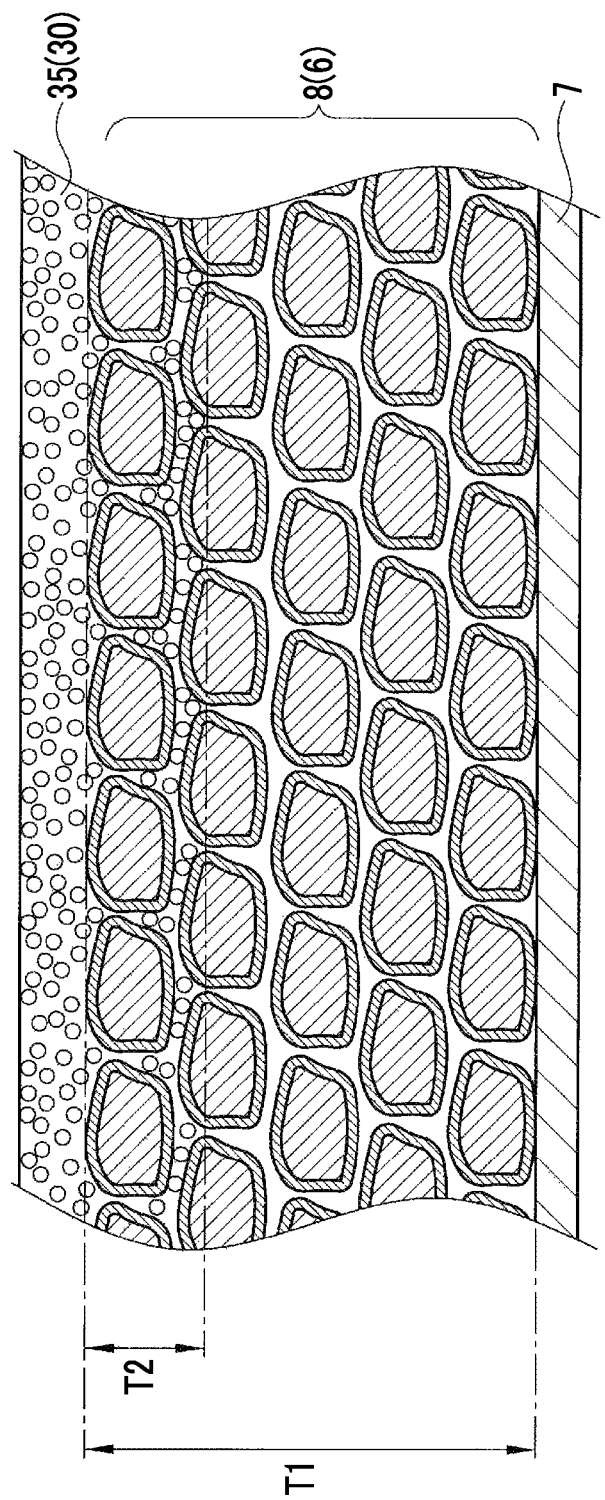

METHOD OF PRODUCING A NEGATIVE ELECTRODE SHEET

The disclosure of Japanese Patent Application No. 2017-181353 filed on Sep. 21, 2017 including the specification, drawings and abstract is incorporated herein by reference in its entirety.

BACKGROUND

1. Technical Field

The present disclosure relates to a method of producing a negative electrode sheet constituting a battery, and particularly, to a method of producing a negative electrode sheet having a structure in which a negative electrode mixture layer is formed on a surface of a current collector foil.

2. Description of Related Art

In the related art, as a negative electrode sheet, a negative electrode sheet having a structure in which a negative electrode mixture layer is formed on a surface of a current collector foil is known. As a method of producing a negative electrode sheet having such a structure, for example, methods disclosed in Japanese Unexamined Patent Application Publication No. 2013-77560 (JP 2013-77560 A), and Japanese Unexamined Patent Application Publication No. 2015-201318 (JP 2015-201318 A), are known. Specifically, first, a negative electrode composite material composed of a plurality of wet granules obtained by mixing and granulating negative electrode active material particles, a binder, and a solvent is prepared. Next, when the negative electrode composite material is passed through a gap between a pair of rollers that face each other, the negative electrode composite material is compressed into a film form, the film type negative electrode composite material is attached to a surface of the current collector foil, and thereby a current collector foil to which the film type negative electrode composite material is attached including a film type negative electrode composite material on the surface of the current collector foil is produced.

More specifically, when a negative electrode composite material is passed through a gap between a pair of rollers including a second roller for transferring the negative electrode composite material to the current collector foil and the first roller that is opposed thereto, the negative electrode composite material is compressed into a film form and the film type negative electrode composite material is attached to the second roller. Then, the film type negative electrode composite material (film type negative electrode composite material) attached to the second roller is transferred (attached) to the surface of the current collector foil. Then, when the film type negative electrode composite material on the surface of the current collector foil is dried, a negative electrode mixture layer is formed on the surface of the current collector foil.

SUMMARY

Incidentally, when a negative electrode composite material composed of wet granules is passed through a gap between a pair of rollers that face each other, and the negative electrode composite material is thus compressed into a film form, shear stress is generated in negative electrode active material particles contained in the negative electrode composite material and the negative electrode active material particles may break. When the negative electrode active material particles break and thus a specific surface area of the negative electrode active material becomes larger, if initial charging of a secondary battery using a negative electrode sheet containing the negative electrode active material particles is performed, a large amount of gas is generated in the battery.

The present disclosure provides a method of producing a negative electrode sheet through which it is possible to reduce the occurrence of breaking of the negative electrode active material particles.

According to an aspect of the present disclosure, there is provided a method of producing a negative electrode sheet, including forming a fluoride coating on surfaces of a plurality of negative electrode active material particles by performing a fluorination treatment on the surfaces of the plurality of negative electrode active material particles; producing a negative electrode composite material containing a plurality of wet granules obtained by mixing and granulating the plurality of negative electrode active material particles with the fluoride coating on the surfaces, a binder, and water as a solvent; causing the negative electrode composite material to pass through a gap between two rollers that face each other, compressing the negative electrode composite material into a film, and attaching the film to a surface of a current collector foil; and forming a negative electrode mixture layer on the surface of the current collector foil by drying the film on the surface of the current collector foil.

In the above production method, in a fluorination treatment process, when the surfaces of the plurality of negative electrode active material particles are subjected to a fluorination treatment, a fluoride coating is formed on the surfaces of the negative electrode active material particles. Then, in a negative electrode composite material producing process, when the fluorinated negative electrode active material particles, a binder, and water as a solvent are mixed and granulated, the negative electrode composite material composed of the plurality of wet granules is produced. Then, in a film forming process, when the negative electrode composite material is passed through a gap between two rollers that face each other, the negative electrode composite material is compressed into a film form, the film type negative electrode composite material is attached to the surface of the current collector foil, and thereby a film type negative electrode composite material-attached current collector foil including the film type negative electrode composite material on the surface of the current collector foil is produced.

In this manner, in the above production method, the film forming process is performed when a fluoride coating has been formed on the surfaces of the negative electrode active material particles. Accordingly, in the film forming process, when the negative electrode composite material containing the negative electrode active material particles is passed through the gap between two rollers, the negative electrode composite material is compressed into a film form and the negative electrode active material particles break less easily. This is because the fluoride coating functions as a protective film. Thus, according to the above production method, it is possible to reduce the occurrence of breaking of the negative electrode active material particles.

In the aspect, the plurality of negative electrode active material particles may include graphite particles and the fluoride coating may include graphite fluoride.

In the aspect, the method may further include, after attaching the film to the surface of the current collector foil, before drying the film on the surface of the current collector foil is dried, applying a coating solution containing insulating particles having electrical insulating properties, a binder, and water as a solvent to the surface of the film on the surface of the current collector foil. When the film on the surface of the current collector foil is dried, the film and the coating solution may be dried such that the negative electrode mixture layer may be formed on the surface of the current collector foil and an insulating layer in which the coating solution is dried may be also formed on a surface of the negative electrode mixture layer.

The above production method includes a coating process before a drying process in which the film of the negative electrode composite material on the surface of the current collector foil is dried after the film forming process. In the coating process, a coating solution (for example, a paste) containing insulating particles having electrical insulating properties and water as a solvent is applied to the surface of the film type negative electrode composite material of the film type negative electrode composite material-attached current collector foil.

Incidentally, as in the related art, when surfaces of negative electrode active material particles are not subjected to a fluorination treatment, and a film type negative electrode composite material-attached current collector foil is produced using a negative electrode composite material composed of a plurality of wet granules obtained by mixing and granulating negative electrode active material particles, a binder, and water as a solvent in a film forming process, and then a coating solution containing insulating particles and water as a solvent is applied to the surface of the film type negative electrode composite material of the film type negative electrode composite material-attached current collector foil, a large amount of the coating solution penetrates (permeates) into the film type negative electrode composite material, and it is not possible to appropriately form a film of the coating solution on the surface of the film type negative electrode composite material.

On the other hand, in the above production method, as described above, in the fluorination treatment process, the surfaces of the negative electrode active material particles are subjected to a fluorination treatment and thus the fluoride coating is formed on the surfaces of the negative electrode active material particles. Then, the film type negative electrode composite material-attached current collector foil is produced in the film forming process using the negative electrode composite material composed of a plurality of wet granules obtained by mixing and granulating the fluorinated negative electrode active material particles, a binder, and water as a solvent.

In the fluorination treatment process, when the surfaces of the negative electrode active material particles are covered with a graphite fluoride coating, water repellency is imparted to the surfaces of the negative electrode active material particles. In the above production method, since the film type negative electrode composite material-attached current collector foil is produced in the film forming process using the negative electrode composite material containing negative electrode active material particles having such water repellency, the surface of the film type negative electrode composite material of the produced film type negative electrode composite material-attached current collector foil also has water repellency. Therefore, in the coating process, when a coating solution containing insulating particles and water as a solvent is applied to the surface of the film type negative electrode composite material of the film type negative electrode composite material-attached current collector foil, the coating solution is easily repelled by the surface of the film type negative electrode composite material and it is difficult for the coating solution to penetrate (permeate) into the film type negative electrode composite material. Thereby, it is possible to appropriately form a film of the coating solution on the surface of the film type negative electrode composite material.

In addition, in the above production method, in the drying process, the film type negative electrode composite material is dried, the coating solution is dried, the negative electrode mixture layer is formed on the surface of the current collector foil, and the insulating layer (the dried coating solution) is formed on the surface of the negative electrode mixture layer. In this manner, in the drying process, since both the film type negative electrode composite material and the coating solution are dried at the same time, it is efficient compared to when the film type negative electrode composite material and the coating solution are separately dried. Here, as the insulating particles, for example, boehmite ($Al_2O_3 \cdot H_2O$) particles can be exemplified.

In the aspect, when the fluoride coating is formed on the surfaces of the plurality of negative electrode active material particles, a thickness of the coating may be within a range of 50 nm to 110 nm.

In the above production method, in the fluorination treatment process, the thickness of the coating (graphite fluoride coating) formed on the surfaces of the negative electrode active material particles is set to a thickness within a range of 50 nm or more and 110 nm or less. When the thickness of the graphite fluoride coating is 50 nm or more, in the film forming process, the negative electrode composite material containing the negative electrode active material particles covered with the coating is passed through a gap between two rollers and is compressed into a film form and it is very difficult for the negative electrode active material particles to break. Therefore, it is possible to further reduce the occurrence of breaking of the negative electrode active material particles.

Incidentally, as the thickness of the coating formed on the surfaces of the negative electrode active material particles becomes thicker, it is possible to make it more difficult for the negative electrode active material particles to break in the film forming process. However, when the coating formed on the surfaces of the negative electrode active material particles is too thick, an internal resistance (IV resistance) in the battery produced using the negative electrode active material is high. Therefore, it is not preferable to make the coating too thick. On the other hand, in the above production method, the thickness of the graphite fluoride coating is reduced to 110 nm or less. Therefore, it is possible to further reduce the occurrence of breaking of the negative electrode active material particles and reduce an increase in the internal resistance (IV resistance) of the battery.

In the aspect, the drying of the film on the surface of the current collector foil may include heating the coating solution to 100° C.; after the coating solution is heated to 100° C., heating the film to 100° C. while the coating solution is maintained at 100° C.; and after the film is heated to 100° C., heating the coating solution and the film to 120° C.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 9 is a diagram for explaining a penetration thickness of a coating solution.

DETAILED DESCRIPTION OF EMBODIMENTS

Figure 1:
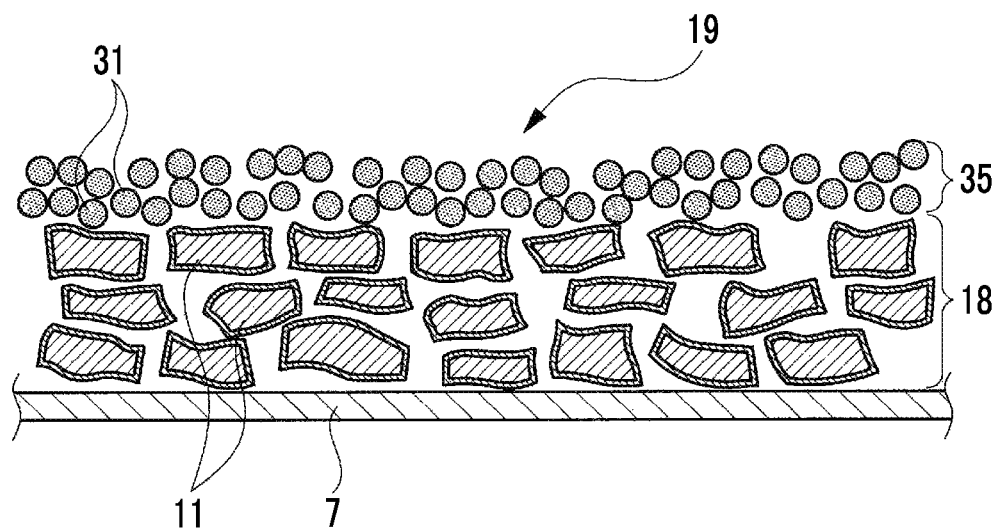
FIG. 1 is a sectional view (schematic diagram) of a negative electrode sheet according to an embodiment.

Specific embodiments of the present disclosure will be described below in detail with reference to the drawings. In the present embodiment, the present disclosure is applied in production of a negative electrode sheet of a lithium ion secondary battery. In the present embodiment, a negative electrode sheet 19 including a current collector foil 7, a negative electrode mixture layer 18 formed on a surface of the current collector foil 7, and an insulating layer 35 formed on a surface of the negative electrode mixture layer 18 is produced (refer to FIG. 1).

In the present embodiment, in a fluorination treatment process, when surfaces of a plurality of negative electrode active material particles 13 composed of graphite particles are subjected to a fluorination treatment, a coating 12 made of graphite fluoride is formed on the surfaces of the negative electrode active material particles 13. Thereby, coated negative electrode active material particles 11 including the negative electrode active material particles 13 and the coating 12 covering the surfaces thereof are obtained (refer to FIG. 2). Then, in a negative electrode composite material producing process, the fluorinated negative electrode active material particles 13 (that is, the coated negative electrode active material particles 11), a binder, and water as a solvent are mixed and granulated to produce a negative electrode composite material 6 composed of a plurality of wet granules 16. While graphite particles are used as a plurality of negative electrode active material particles in the present embodiment, carbon particles other than graphite particles, silicon particles, silicon oxide particles, tin particles, or tin oxide particles may be used.

Then, in a film forming process, when the negative electrode composite material 6 is passed through a gap between a pair of rollers 1 and 2 that face each other, the negative electrode composite material 6 is compressed into a film form, the film type negative electrode composite material 6 (referred to as a film type negative electrode composite material 8) is attached to a surface of the current collector foil 7, and thereby a film type negative electrode composite material-attached current collector foil 9 containing the film type negative electrode composite material 8 on the surface of the current collector foil 7 is produced. Then, in a coating process, a coating solution 30 containing insulating particles 31 having electrical insulating properties, a binder, and water as a solvent is applied to a surface of the film type negative electrode composite material 8 of the film type negative electrode composite material-attached current collector foil 9.

Then, in a drying process, the film type negative electrode composite material 8 is dried and the coating solution 30 is also dried, and thus the negative electrode mixture layer 18 is formed on the surface of the current collector foil 7 and the insulating layer 35 (the dried coating solution 30) is also formed on a surface of the negative electrode mixture layer 18. Thereby, the negative electrode sheet 19 including the current collector foil 7, the negative electrode mixture layer 18 formed on the surface of the current collector foil 7, and the insulating layer 35 formed on the surface of the negative electrode mixture layer 18 is obtained.

Figure 2:
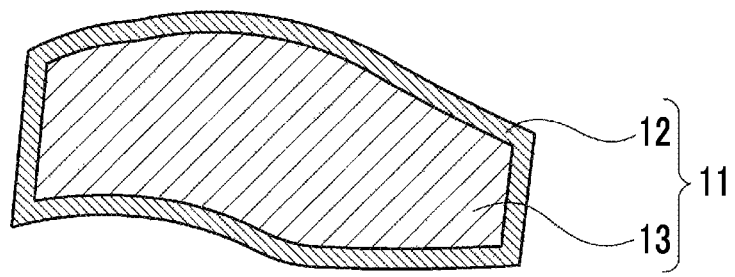
FIG. 2 is a sectional view (schematic diagram) of a coated negative electrode active material particle.
Figure 3:
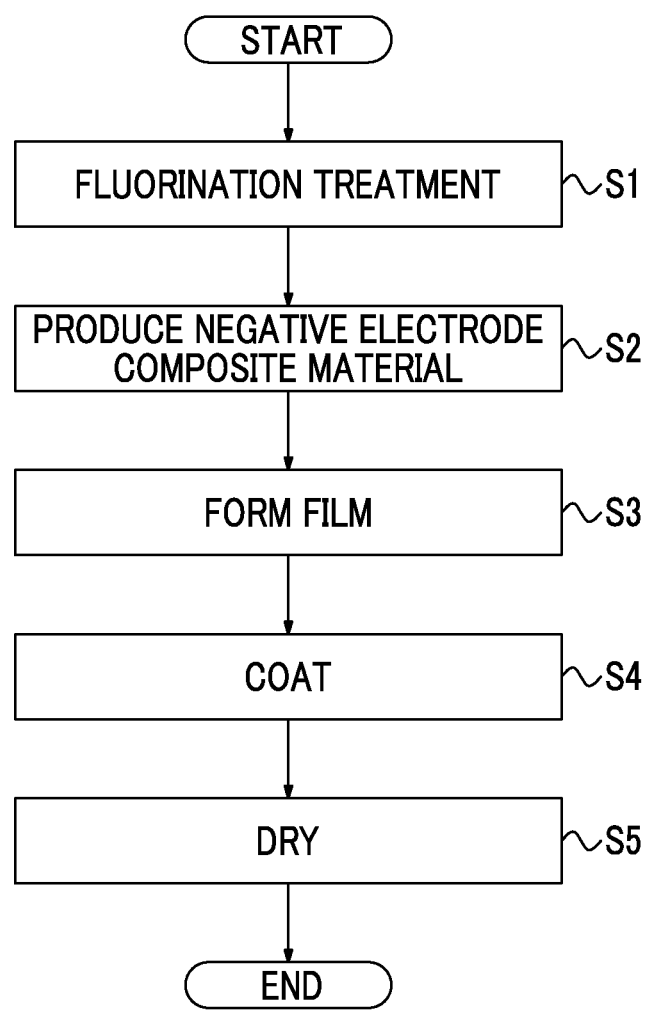
FIG. 3 is a flowchart showing a flow of a method of producing a negative electrode sheet according to an embodiment.
Figure 4:
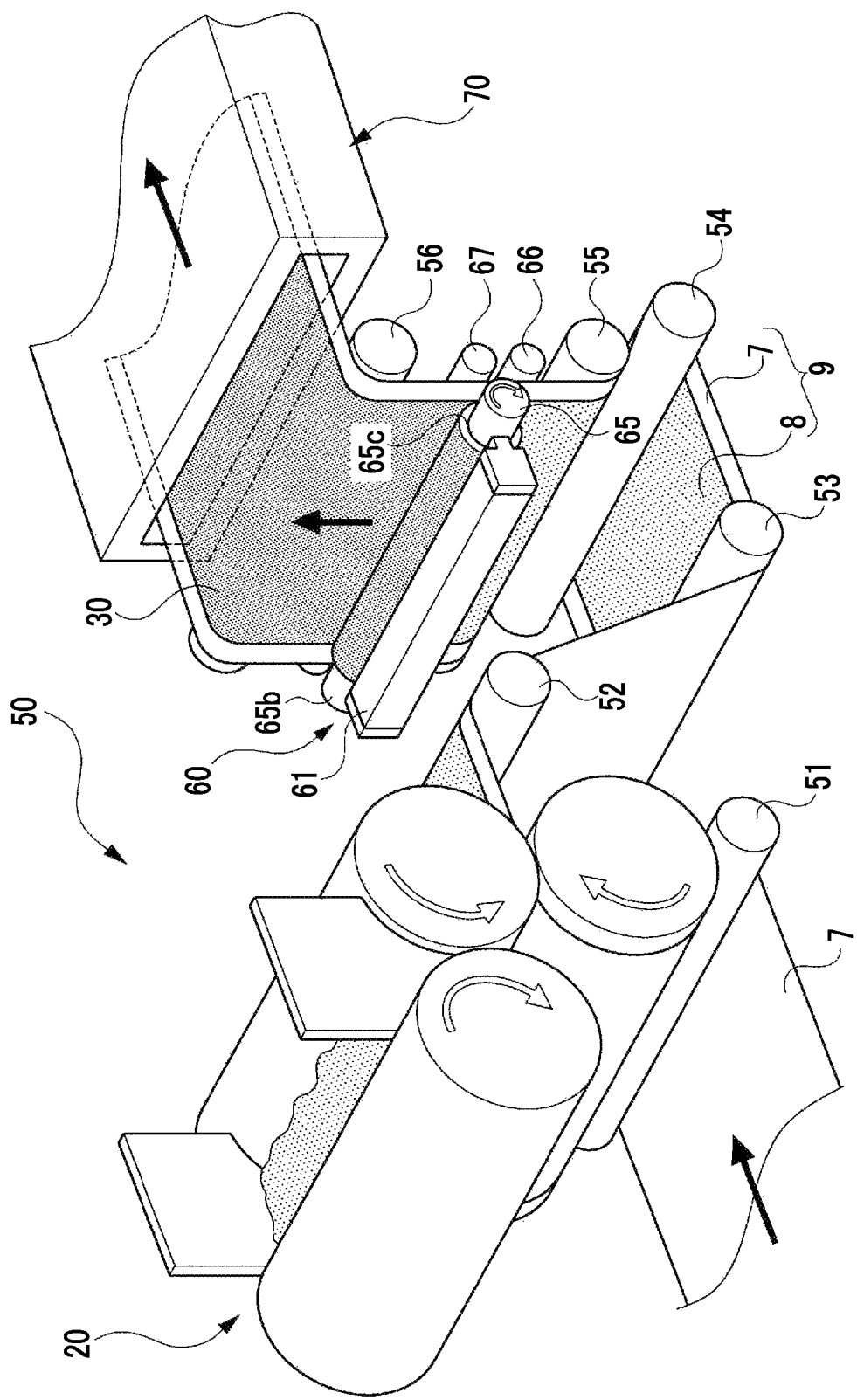
FIG. 4 is a schematic diagram of a negative electrode sheet producing device according to an embodiment.
Figure 5:
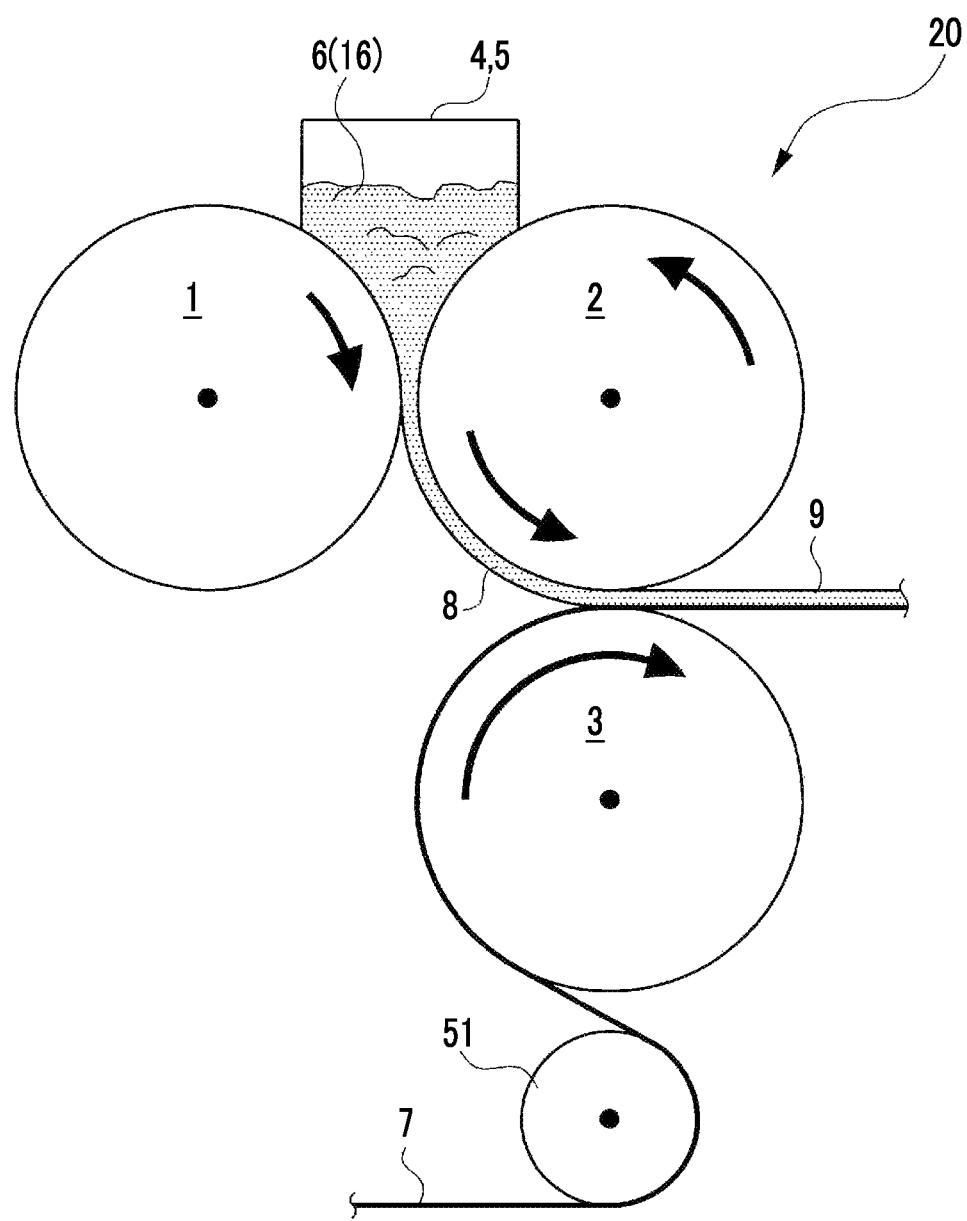
FIG. 5 is a schematic diagram of a roller film forming device in the negative electrode sheet producing device.
Figure 6:
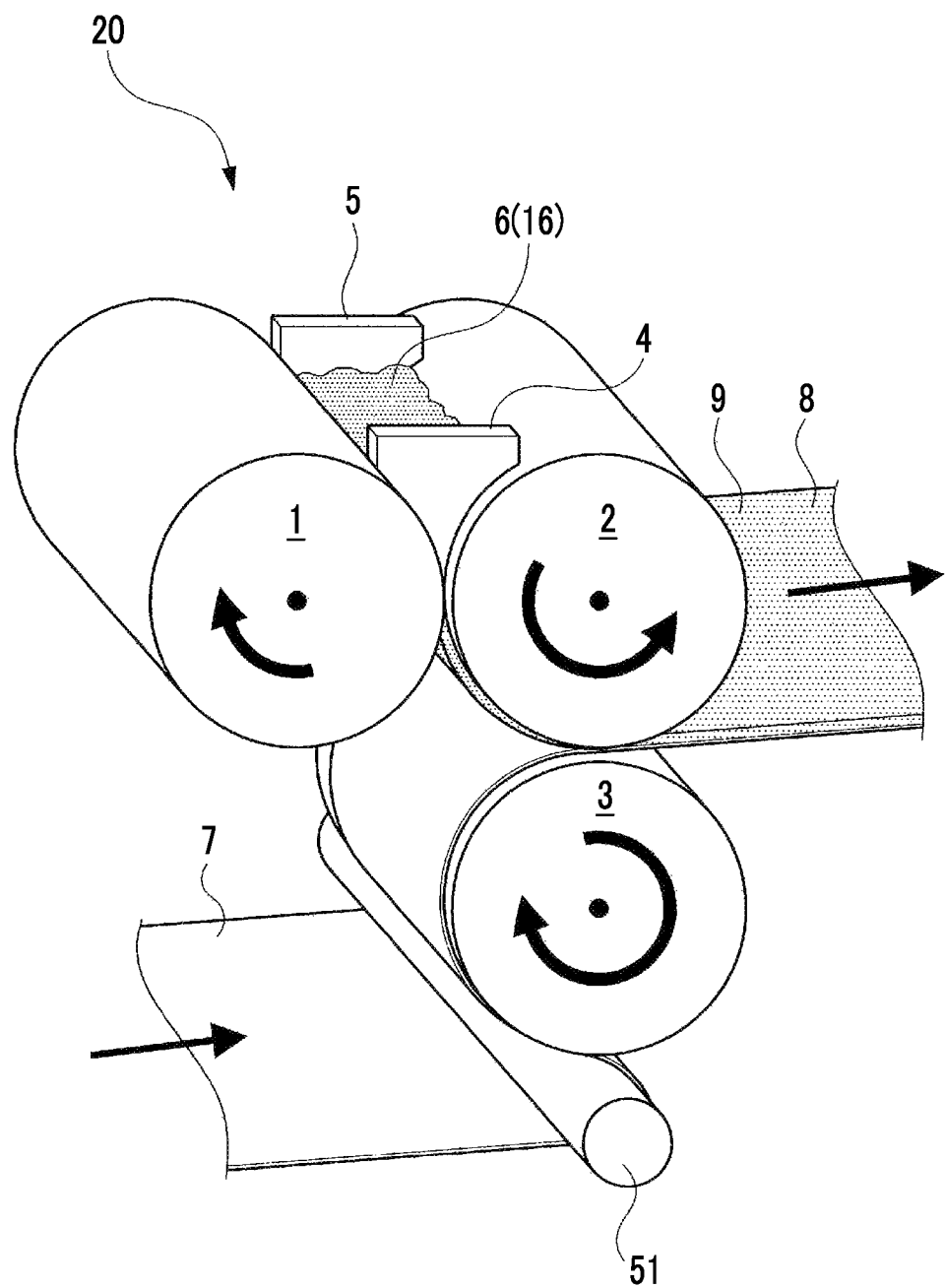
FIG. 6 is a schematic perspective view of the roller film forming device.

Here, a method of producing the negative electrode sheet 19 according to the present embodiment will be described in detail. FIG. 1 is a schematic diagram of a cross section of the negative electrode sheet 19 produced according to the production method of the present embodiment. FIG. 2 is a schematic diagram of a cross section of the coated negative electrode active material particle 11 in which the coating 12 made of graphite fluoride is formed on a surface of the negative electrode active material particle 13. FIG. 3 is a flowchart showing a flow of a method of producing the negative electrode sheet 19 according to an embodiment. FIG. 4 is a schematic diagram of a negative electrode sheet producing device 50 according to an embodiment. As shown in FIG. 4, the negative electrode sheet producing device 50 is a device in which a roller film forming device 20, a gravure coating device 60, and a drying device 70 are combined. FIG. 5 is a schematic diagram of the roller film forming device 20 which is a part of the negative electrode sheet producing device 50. FIG. 6 is a schematic perspective view of the roller film forming device 20.

As shown in FIG. 3, first, in Step S1 (fluorination treatment process), when surfaces of the plurality of negative electrode active material particles 13 composed of graphite particles are subjected to a fluorination treatment, the coating 12 made of graphite fluoride is formed on the surfaces of the negative electrode active material particles 13. Specifically, while the plurality of negative electrode active material particles 13 composed of graphite particles are disposed in a chamber set to a temperature in a range of 350° C. to 400° C., and additionally, HF gas and LiF are introduced as a catalyst, fluorine gas is supplied to the chamber, and left for a predetermined time.

In this manner, a surface layer of the negative electrode active material particles 13 composed of graphite particles reacts with fluorine to form a coating of graphite fluoride and the coating 12 made of graphite fluoride $(C_2F)_n$ is formed on the surfaces of the negative electrode active material particles 13 composed of graphite particles (refer to FIG. 2). Thereby, as shown in FIG. 2, the coated negative electrode active material particles 11 including the negative electrode active material particles 13 and the coating 12 covering the surfaces thereof can be obtained. Here, a thickness of the coating 12 made of graphite fluoride can be adjusted according to a time for which it is left after fluorine gas is supplied to the chamber (a time for which it reacts with fluorine gas).

Next, in Step S2 (negative electrode composite material producing process), the negative electrode active material particles 13 fluorinated in Step S1 (that is, the coated negative electrode active material particles 11), a binder, and water as a solvent are mixed and granulated, and thus a plurality of wet granules 16 are produced, and the negative electrode composite material 6 made of the plurality of wet granules 16 is produced. Specifically, when the coated negative electrode active material particles 11, a binder, and water as a solvent are supplied to a known stirring granulator (not shown), and stirred, the coated negative electrode active material particles 11, the binder, and water as a solvent are mixed (dispersed) and granulated to obtain the plurality of wet granules 16. Thereby, the negative electrode composite material 6 made of the plurality of wet granules 16 is obtained.

Here, in the present embodiment, when the wet granules 16 (the negative electrode composite material 6) are produced, a mixing ratio between the coated negative electrode active material particles 11 and the binder which are solid contents is 99:1 by weight ratio. In addition, water as a solvent is added so that a solid content of the wet granules 16 (the negative electrode composite material 6) is 73 wt %. Here, in the present embodiment, carboxymethyl cellulose (CMC) is used as the binder. In addition, the wet granules 16 are substances (granular substances) obtained by performing aggregation (bonding) while water as a solvent is retained (absorbed) in the plurality of coated negative electrode active material particles 11 and the binder. The negative electrode composite material 6 is an aggregate of such wet granules 16.

Next, the process advances to Step S3 (film forming process), and when the negative electrode composite material 6 is passed through a gap between a pair of rollers 1 and 2 that face each other, the negative electrode composite material 6 is compressed into a film form, the film type negative electrode composite material 6 (referred to as the film type negative electrode composite material 8) is attached to the surface of the current collector foil 7, and the film type negative electrode composite material-attached current collector foil 9 including the film type negative electrode composite material 8 on the surface of the current collector foil 7 is produced. Specifically, using the roller film forming device 20 shown in FIG. 5 and FIG. 6, the process of Step S3 (film forming process) is performed. Here, the roller film forming device 20 is a part of the negative electrode sheet producing device 50 (refer to FIG. 4).

As shown in FIG. 5 and FIG. 6, the roller film forming device 20 includes three rollers including a first roller 1, a second roller 2, and a third roller 3. The first roller 1 and the second roller 2 are disposed side by side in a horizontal direction (left-right direction in FIG. 5). On the other hand, the second roller 2 and the third roller 3 are disposed side by side in a vertical direction (up-down direction in FIG. 5). In addition, the first roller 1 and the second roller 2 face each other with a slight interval therebetween. Similarly, the second roller 2 and the third roller 3 face each other with a slight interval therebetween. In addition, partition plates 4 and 5 are disposed apart from each other in a roller width direction (axial direction, a direction orthogonal to the plane of paper in FIG. 5) above a part in which the first roller 1 and the second roller 2 face each other.

In addition, as indicated by arrows in FIG. 5 and FIG. 6, rotation directions of the three rollers 1 to 3 are set so that rotation directions of two adjacent rollers (that face each other) are opposite directions, that is, two rollers that face each other rotate forward. Then, surfaces of these rollers move downward according to rotation at the part in which the first roller 1 and the second roller 2 face each other. In addition, the surfaces of these rollers move rightward according to rotation at a part at which the second roller 2 and the third roller 3 face each other. In addition, rotational speeds are set such that, as a movement speed of a surface of a roller according to rotation, the first roller 1 has the lowest speed, the third roller 3 has the highest speed, and the second roller 2 has an intermediate speed.

In such a roller film forming device 20, the negative electrode composite material 6 produced in Step S2 (negative electrode composite material producing process) is supplied to an accommodation space between the partition plates 4 and 5 positioned above the part in which the first roller 1 and the second roller 2 face each other. In addition, the current collector foil 7 is wrapped around the third roller 3. The current collector foil 7 is a metal foil (copper foil) and passes through the part in which the second roller 2 and the third roller 3 face each other and is transferred from the lower left to the upper right of the third roller 3 according to rotation of the third roller 3. In addition, there is additionally a slight gap between the second roller 2 and the current collector foil 7 at the part at which the second roller 2 and the third roller 3 face each other when the current collector foil 7 is passed therethrough. That is, a gap (a gap when there is no current collector foil 7) between the second roller 2 and the third roller 3 is slightly larger than the thickness of the current collector foil 7.

In Step S3 (film forming process), the negative electrode composite material 6 produced in Step S2 (negative electrode composite material producing process) is supplied to an accommodation space between the partition plates 4 and 5 of the roller film forming device 20. The supplied negative electrode composite material 6 is supplied to a gap part between the first roller 1 and the second roller 2 and passes through a gap between two rollers according to rotation of the first roller 1 and the second roller 2, and is compressed into a film form (refer to FIG. 5). In this case, since the second roller 2 has a higher rotational speed than the first roller 1, the wet granules 16 contained in the negative electrode composite material 6 are stretched more greatly on the surface of the second roller 2 than on the surface of the first roller 1, and are supported on the surface of the second roller 2.

The film type negative electrode composite material 6 (this is referred to as the film type negative electrode composite material 8) supported on the surface of the second roller 2 is transferred according to rotation of the second roller 2 (refer to FIG. 5 and FIG. 6). Then, the current collector foil 7 and the film type negative electrode composite material 8 encounter each other at the part at which the second roller 2 and the third roller 3 face each other. Thus, the film type negative electrode composite material 8 is transferred (attached) to the surface of the current collector foil 7 that is rotating together with the third roller 3 at a higher movement speed from the second roller 2. Thereby, the film type negative electrode composite material-attached current collector foil 9 in which the film type negative electrode composite material 8 is formed on the current collector foil 7 is obtained.

Incidentally, in the related art, when a negative electrode composite material composed of wet granules is passed through a gap between a pair of rollers that face each other and the negative electrode composite material is thus compressed into a film form, shear stress is generated in negative electrode active material particles contained in the negative electrode composite material and the negative electrode active material particles break. When the negative electrode active material particles break and thus a specific surface area of the negative electrode active material becomes larger, if initial charging of a secondary battery using a negative electrode sheet containing the negative electrode active material particles is performed, a large amount of gas is generated in the battery.

On the other hand, in the production method of the present embodiment, in the preceding Step S1 (fluorination treatment process), when surfaces of the negative electrode active material particles 13 are subjected to a fluorination treatment, the coating 12 made of graphite fluoride is formed on the surfaces of the negative electrode active material particles 13. Then, when the coating 12 made of graphite fluoride has been formed on the surfaces of the negative electrode active material particles 13, Step S3 (film forming process) is performed. Therefore, in Step S3 (film forming process), when the negative electrode composite material 6 containing the negative electrode active material particles 13 is passed through a gap between a pair of rollers (the first roller 1 and the second roller 2), the negative electrode composite material 6 is compressed into a film form and the negative electrode active material particles 13 break less easily. This is because the coating 12 made of graphite fluoride functions as a protective film. Therefore, according to the production method of the present embodiment, it is possible to reduce the occurrence of breaking of the negative electrode active material particles 13.

Next, in Step S4 (coating process), the coating solution 30 containing the insulating particles 31 having electrical insulating properties, a binder, and water as a solvent is applied to the surface of the film type negative electrode composite material 8 of the film type negative electrode composite material-attached current collector foil 9. Specifically, as shown in FIG. 4, the process of Step S4 (coating process) is performed using the gravure coating device 60. Here, the gravure coating device 60 is a part of the negative electrode sheet producing device 50 (refer to FIG. 4).

Figure 7:
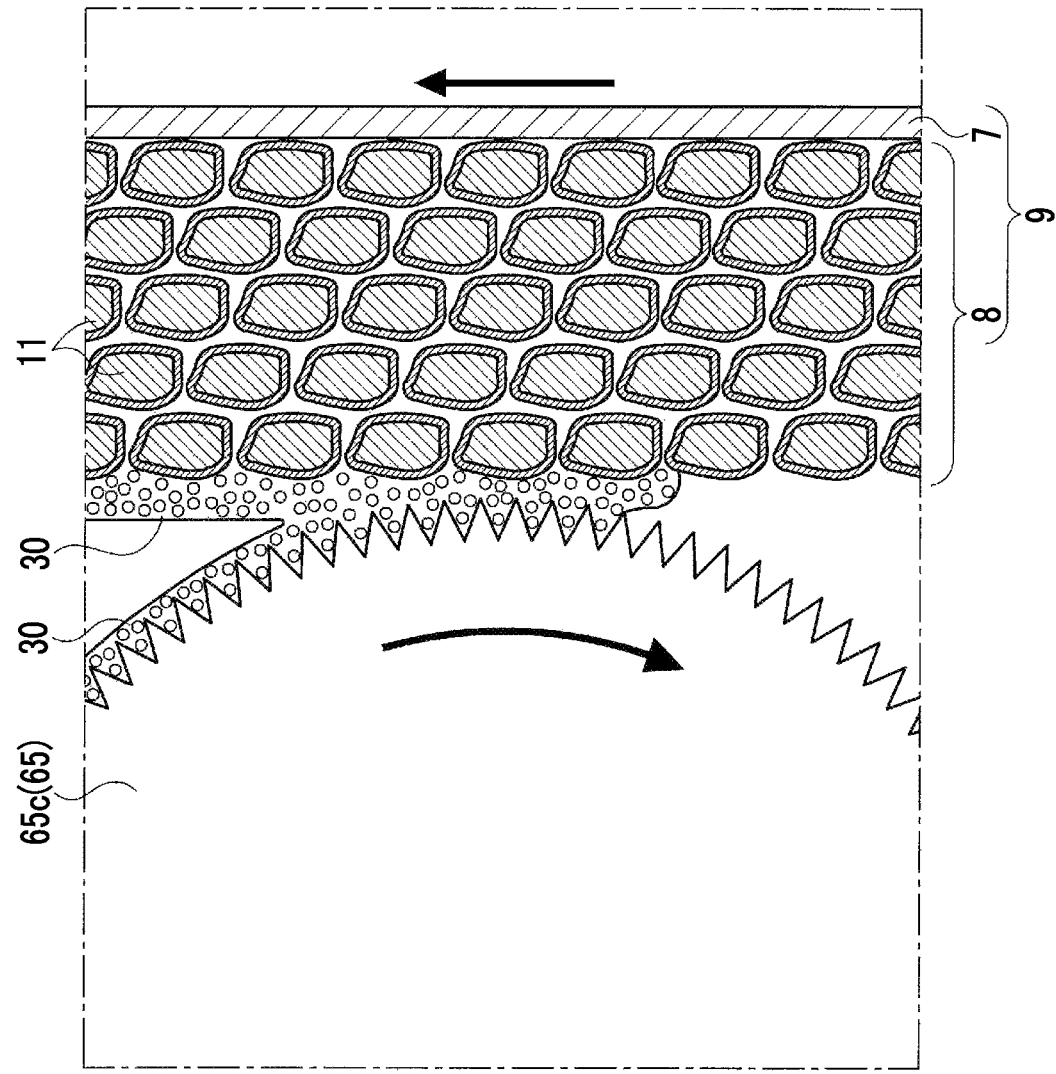
FIG. 7 is a diagram for explaining a coating process.

As shown in FIG. 4, the gravure coating device 60 includes a coating solution supply unit 61, a gravure roller 65, and auxiliary rollers 66 and 67. The coating solution supply unit 61 supplies the coating solution 30 to the outer circumferential surface of the gravure roller 65. The gravure roller 65 includes a rotating shaft part 65*b* and a coating part 65*c* having a larger diameter than the rotating shaft part 65*b*. Here, as shown in FIG. 7, the outer circumferential surface of the coating part 65*c* of the gravure roller 65 has an uneven shape (engraved plate) in order to retain the coating solution 30. FIG. 7 is an enlarged positional view when the coating part 65*c* of the gravure roller 65 is in contact with the film type negative electrode composite material 8 of the film type negative electrode composite material-attached current collector foil 9, and the coating solution 30 attached to the outer circumferential surface of the coating part 65*c* of the gravure roller 65 is applied to the surface of the film type negative electrode composite material 8 of the film type negative electrode composite material-attached current collector foil 9.

In the gravure coating device 60, when the gravure roller 65 rotates around the central axis of the rotating shaft part 65*b* at a constant speed, the coating solution 30 supplied from the coating solution supply unit 61 is sequentially attached to the outer circumferential surface of the coating part 65*c* of the gravure roller 65. Then, as shown in FIG. 7, the coating solution 30 attached to the outer circumferential surface of the coating part 65*c* of the gravure roller 65 is sequentially applied to the surface of the film type negative electrode composite material 8 of the film type negative electrode composite material-attached current collector foil 9 that is transferred by transfer rollers 51, 52, 53, 54, 55, and 56 of the negative electrode sheet producing device 50 according to a rotation operation of the gravure roller 65. Thereby, a film of the coating solution 30 is formed on the surface of the film type negative electrode composite material 8.

Here, in the present embodiment, boehmite ($Al_2O_3 \cdot H_2O$) particles are used as the insulating particles 31. In addition, an acrylic resin and carboxymethyl cellulose (CMC) are used as the binder. In addition, a mixing ratio between the insulating particles 31 (boehmite), the acrylic resin, and CMC which are solid contents of the coating solution 30 is 97:2:1 by weight ratio. In addition, water as a solvent is added so that a solid content of the coating solution 30 is 45 wt %.

Incidentally, as in the related art, when surfaces of negative electrode active material particles are not subjected to a fluorination treatment, and a film type negative electrode composite material-attached current collector foil is produced using a negative electrode composite material composed of a plurality of wet granules obtained by mixing and granulating negative electrode active material particles, a binder, and water as a solvent in a film forming process, and then a coating solution containing insulating particles and water as a solvent is applied to the surface of the film type negative electrode composite material of the film type negative electrode composite material-attached current collector foil, a large amount of the coating solution penetrates (permeates) into the film type negative electrode composite material, and it is not possible to appropriately form a film of the coating solution on the surface of the film type negative electrode composite material.

On the other hand, in the production method of the present embodiment, as described above, in the fluorination treatment process (Step S1), when surfaces of the negative electrode active material particles 13 are subjected to a fluorination treatment, the coating 12 made of graphite fluoride is formed on surfaces of the negative electrode active material particles 13. Then, in the negative electrode composite material producing process (Step S2), the negative electrode composite material 6 made of the plurality of wet granules 16 obtained by mixing and granulating the fluorinated negative electrode active material particles 13 (the coated negative electrode active material particles 11), a binder, and water as a solvent is produced, and the film type negative electrode composite material-attached current collector foil 9 is produced in the film forming process (Step S3) using the negative electrode composite material 6.

In the fluorination treatment process (Step S1), when the surfaces of the negative electrode active material particles 13 are covered with the coating 12 made of graphite fluoride, water repellency is imparted to the surfaces of the negative electrode active material particles 13. In the production method of the present embodiment, since the film type negative electrode composite material-attached current collector foil 9 is produced in the film forming process (Step S3) using the negative electrode composite material 6 containing the negative electrode active material particles 13 having such water repellency, the surface of the film type negative electrode composite material 8 of the produced film type negative electrode composite material-attached current collector foil 9 also has water repellency. Therefore, in the coating process (Step S4), when the coating solution 30 containing the insulating particles 31, a binder, and water as a solvent is applied to the surface of the film type negative electrode composite material 8 of the film type negative electrode composite material-attached current collector foil 9, the coating solution 30 is easily repelled by the surface of the film type negative electrode composite material 8, and it is difficult for the coating solution 30 to penetrate (permeate) into the film type negative electrode composite material 8. Therefore, it is possible to appropriately form a film of the coating solution 30 on the surface of the film type negative electrode composite material 8.

Then, the process advances to Step S5 (drying process), a film of the coating solution 30 on the surface of the film type negative electrode composite material 8 is dried and the film type negative electrode composite material 8 of the film type negative electrode composite material-attached current collector foil 9 is also dried. Therefore, a film of the coating solution 30 becomes the insulating layer 35 and also the film type negative electrode composite material 8 becomes the negative electrode mixture layer 18. Thereby, the negative electrode sheet 19 (refer to FIG. 1) including the current collector foil 7, the negative electrode mixture layer 18 formed on the surface of the current collector foil 7, and the insulating layer 35 formed on the surface of the negative electrode mixture layer 18 is obtained.

Figure 8:
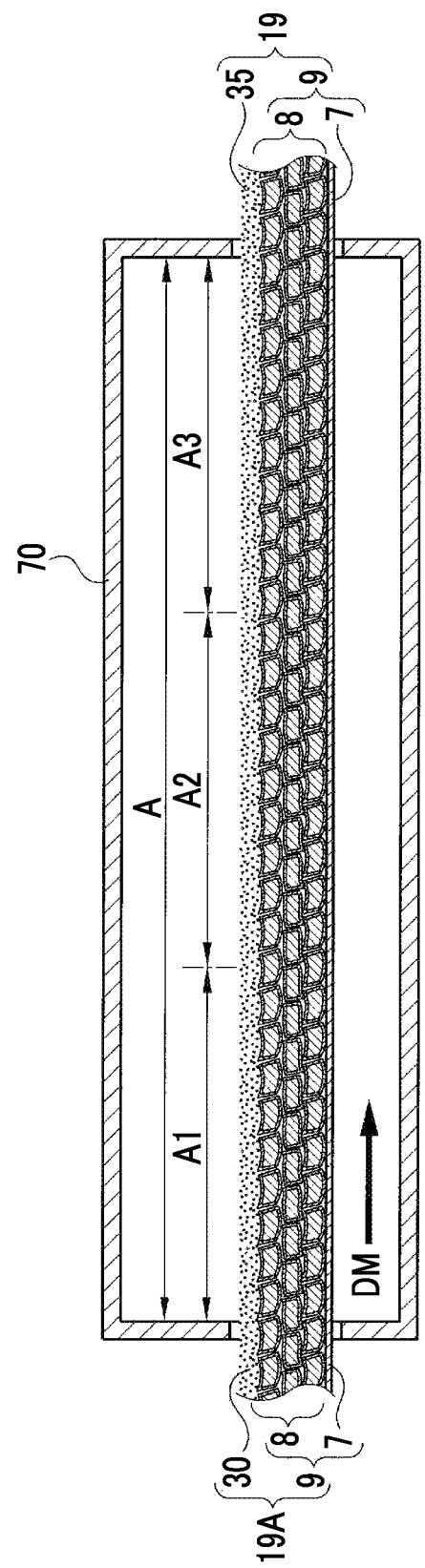
FIG. 8 is a diagram for explaining a drying process.

Specifically, as shown in FIG. 4, the process of Step S5 (drying process) is performed using the drying device 70. Here, the drying device 70 is a part of the negative electrode sheet producing device 50 (refer to FIG. 4), and is a drying furnace that extends in a transfer direction DM (direction from the left to the right in FIG. 8) of the film type negative electrode composite material-attached current collector foil 9 (hereinafter referred to as a precursor-negative electrode sheet 19A) to which the coating solution 30 is applied as shown in FIG. 8. In the present embodiment, as shown in FIG. 8, a drying area A inside the drying device 70 is divided into three areas including a drying initial stage area A1, a drying middle stage area A2, and a drying final stage area A3. Here, FIG. 8 is a schematic diagram of the inside of the drying device 70, and is a diagram for explaining a drying process in which the precursor-negative electrode sheet 19A passes through the inside of the drying device 70 and is dried.

In the present embodiment, in the drying initial stage area A1, the precursor-negative electrode sheet 19A is heated so that the temperature of the precursor-negative electrode sheet 19A is 100° C. (specifically, the temperature of the coating solution 30 is a boiling point of water as a solvent). In addition, in the drying middle stage area A2, the precursor-negative electrode sheet 19A is heated so that the temperature of the precursor-negative electrode sheet 19A is 100° C. (a boiling point of water which is a solvent of the coating solution 30 and the negative electrode composite material 6). In addition, in the drying final stage area A3, the precursor-negative electrode sheet 19A is heated so that the temperature of the precursor-negative electrode sheet 19A is 120° C.

In this manner, in Step S5 (drying process) of the present embodiment, in the drying initial stage area A1, when the precursor-negative electrode sheet 19A is heated so that the temperature of the coating solution 30 is 100° C. (that is, a boiling point of water as a solvent), the solvent (water) contained in the coating solution 30 is quickly removed (evaporated) during initial drying. Therefore, during initial drying, the fluidity of the coating solution 30 is reduced (or the fluidity disappears), and it is possible to alleviate (or remove) repelling of the coating solution 30 by the surface of the film type negative electrode composite material 8. Therefore, in Step S5 (drying process), it is possible to form the insulating layer 35 with a uniform thickness on the surface of the negative electrode mixture layer 18.

Here, in the drying initial stage area A1, unlike the present embodiment, if the precursor-negative electrode sheet 19A is heated so that the temperature of the coating solution 30 is 70° C. (that is, a temperature 30° C. lower than a boiling point of water as a solvent), in the drying middle stage area A2 and the drying final stage area A3, when heating is performed in the same manner as in the present embodiment, it is not possible to form an insulating layer with a uniform thickness. Specifically, during drying, the coating solution 30 is repelled by the surface of the film type negative electrode composite material 8, and small parts in which the thickness of the coating solution 30 (the insulating layer 35) is thinned (or there is no coating solution 30) are generated. Therefore, in the initial stage (the drying initial stage area A1) of the drying process, the precursor-negative electrode sheet 19A is preferably heated so that the temperature of the coating solution 30 is 100° C. (that is, a boiling point of water as a solvent).

Here, the negative electrode mixture layer 18 and the insulating layer 35 may be formed on only one surface of the current collector foil 7 (that is, a one surface-coated negative electrode sheet is produced) or formed on both surfaces (that is, a both surfaces-coated negative electrode sheet is produced). When the negative electrode mixture layer 18 and the insulating layer 35 are formed on both surfaces of the current collector foil 7, after a one surface-coated negative electrode sheet in which the negative electrode mixture layer 18 and the insulating layer 35 are formed on one surface of the current collector foil 7 is produced, the processes of Steps S3, S4, and S5 may be performed on the surface of the current collector foil 7 of the one surface-coated negative electrode sheet on which the negative electrode mixture layer 18 and the insulating layer 35 are not formed.

The negative electrode sheet 19 produced as described above is then combined with a positive electrode sheet and a separator to form an electrode body. Next, a terminal member is attached to the electrode body and an electrode body and an electrolytic solution are then accommodated in a battery case. Thereby, a lithium ion secondary battery is completed.

Examples 1 to 5

In Examples 1 to 5, negative electrode sheets 19 were produced in the same manner except that only a surface treatment time in Step S1 (fluorination treatment process) was changed. Specifically, in Examples 1 to 5, in Step S1 (fluorination treatment process), only a time for which it was left after fluorine gas was supplied to the chamber (a time for which it reacted with fluorine gas) was varied, and thus the thickness of the coating 12 formed on the surface of the negative electrode active material particles 13 varied. Here, in Examples 1 to 5, the negative electrode mixture layer 18 and the insulating layer 35 were formed on both surfaces of the current collector foil 7. That is, in Examples 1 to 5, the negative electrode sheet 19 including the negative electrode mixture layer 18 and the insulating layer 35 on both surfaces of the current collector foil 7 was produced.

In addition, in Examples 1 to 5, lithium ion secondary batteries were produced using the negative electrode sheets 19. Here, in the lithium ion secondary batteries of Examples 1 to 5, only the negative electrode sheets 19 were different from each other and other details were the same.

In Example 1, the thickness of the coating 12 was 43.8 nm. In Example 2, the thickness of the coating 12 was 50.2 nm. In Example 3, the thickness of the coating 12 was 76.3 nm. In Example 4, the thickness of the coating 12 was 100.6 nm. In Example 5, the thickness of the coating 12 was 112.6 nm.

In addition, in Comparative Example 1, a negative electrode sheet was produced in the same manner as in Example 1 except that the process of Step S1 (fluorination treatment process) was not performed. That is, the negative electrode sheet was produced without forming the coating 12 on the surface of the negative electrode active material particles 13. In addition, the lithium ion secondary battery of Comparative Example 1 was produced using this negative electrode sheet. Here, in the lithium ion secondary battery of Comparative Example 1, only a negative electrode sheet was different from that of Example 1, and others details were the same.

(Comparative Test for Amount of Gas Generated During Initial Charging)

Initial charging of the lithium ion secondary batteries of Examples 1 to 5 and Comparative Example 1 produced as described above was performed and an amount of gas generated during an initial charging period for each of the lithium ion secondary batteries was measured. Here, in this test, an amount of gas generated in each of the lithium ion secondary batteries was acquired as a weight ($mg/cm^2$) per unit area of a part (coated part) of the negative electrode sheet in which a negative electrode mixture layer was formed. The results are shown in Table 1.

TABLE 1

| | Fluorination treatment | Coating thickness (nm) | Amount of gas generated ($mg/cm^2$) | Determination | IV resistance value (mΩ) | Determination |
|---|---|---|---|---|---|---|
| Example 1 | Yes | 43.8 | 8.4 | Δ | 2.7 | ○ |
| Example 2 | Yes | 50.2 | 6.1 | ○ | 2.8 | ○ |
| Example 3 | Yes | 76.3 | 5.9 | ○ | 3.1 | ○ |
| Example 4 | Yes | 100.6 | 3.2 | ○ | 3.2 | ○ |
| Example 5 | Yes | 112.6 | 2.2 | ○ | 4.7 | Δ |
| Comparative Example 1 | No | — | 23.9 | X | 2.6 | ○ |

As shown in Table 1, in Comparative Example 1, the amount of gas generated was 23.9 ($mg/cm^2$). On the other hand, in all of Examples 1 to 5, the amount of gas generated was less than 10 ($mg/cm^2$), and the amount of gas generated during initial charging were significantly reduced compared to Comparative Example 1. Specifically, in Example 1, the amount of gas generated was 8.4 ($mg/cm^2$). In Example 2, the amount of gas generated was 6.1 ($mg/cm^2$). In Example 3, the amount of gas generated was 5.9 ($mg/cm^2$). In Example 4, the amount of gas generated was 3.2 ($mg/cm^2$). In Example 5, the amount of gas generated was 2.2 ($mg/cm^2$).

Further, the reason why an amount of gas generated was reduced in Examples 1 to 5 was speculated to be as follows. Specifically, in Comparative Example 1, it is thought that, since the coating 12 was not formed on the surface of the negative electrode active material particles 13, in Step S3 (film forming process), when the negative electrode composite material 6 containing the negative electrode active material particles 13 was passed through a gap between a pair of rollers (the first roller 1 and the second roller 2), the negative electrode composite material 6 was compressed into a film form, a large shear stress was generated in the negative electrode active material particles 13 contained in the negative electrode composite material 6, and the negative electrode active material particles 13 broke. In Comparative Example 1, it is thought that, since the negative electrode active material particles 13 broke in this manner and thus a specific surface area of the negative electrode active material particles 13 increased, when initial charging of the lithium ion secondary battery using the negative electrode sheet containing the negative electrode active material particles 13 was performed, a large amount of gas was generated in the battery.

On the other hand, in Examples 1 to 5, in Step S1 (fluorination treatment process), when the surfaces of the negative electrode active material particles 13 were subjected to a fluorination treatment, the coating 12 made of graphite fluoride was formed on the surfaces of the negative electrode active material particles 13, and Step S3 (film forming process) was performed when the coating 12 made of graphite fluoride had been formed on the surfaces of the negative electrode active material particles 13. Therefore, it is thought that, in Step S3 (film forming process), when the negative electrode composite material 6 containing the negative electrode active material particles 13 was passed through a gap between a pair of rollers (the first roller 1 and the second roller 2), the negative electrode composite material 6 was compressed into a film form, and the negative electrode active material particles 13 broke less easily. This is because the coating 12 made of graphite fluoride functioned as a protective film. Thus, it is thought that, in Examples 1 to 5, it was possible to reduce the occurrence of breaking of the negative electrode active material particles 13, and it was possible to reduce an amount of gas generated compared to Comparative Example 1.

Here, when comparing amounts of gas generated in Examples 1 to 5, it was found that the amount of gas generated was the largest in Example 1 in which the thickness of the coating 12 was the thinnest, and the amount of gas generated became smaller as the thickness of the coating 12 became thicker in the examples. Specifically, in Example 1 in which the thickness of the coating 12 made of graphite fluoride was 43.8 nm, the amount of gas generated was 8.4 ($mg/cm^2$), which was larger than those of the other Examples 2 to 5. On the other hand, in Examples 2 to 5 in which the thickness of the coating 12 made of graphite fluoride was 50 nm or more, the amount of gas generated was reduced to 6.1 ($mg/cm^2$) or less.

According to these results, it can be understood that, when the thickness of the coating 12 made of graphite fluoride was 50 nm or more, in Step S3 (film forming process), if the negative electrode composite material 6 containing the negative electrode active material particles 13 covered with the coating 12 was passed through a gap between a pair of rollers (the first roller 1 and the second roller 2) and thus compressed into a film form, it was very difficult for the negative electrode active material particles 13 to break, and it was possible to further reduce the occurrence of breaking of the negative electrode active material particles 13. Thus, the thickness of the coating 12 made of graphite fluoride is more preferably 50 nm or more.

(Measurement Test of IV Resistance Value)

In addition, IV resistance values of the lithium ion secondary batteries of Examples 1 to 5 and Comparative Example 1 produced as described above were measured. Specifically, for the lithium ion secondary batteries, the status of an SOC was adjusted to 80%, discharging was performed for 10 seconds at a constant current value of 1C under a temperature environment of 25° C., and a battery voltage value when discharging ended was measured. In addition, discharging was performed under conditions the same as above expect that only a discharging current value was changed to 3C, 5C, or 10C, and battery voltage values when discharging for 10 seconds according to respective discharging current values ended were measured.

Then, for the lithium ion secondary batteries, in a coordinate plane in which a horizontal axis represents a discharging current value and a vertical axis represents a battery voltage value when discharging ends, data obtained according to the above discharging was plotted. Then, for the lithium ion secondary batteries, an approximate straight line (primary equation) was calculated by a least-squares method on the basis of such plot data. A gradient thereof was obtained as an internal resistance value (IV resistance value) of each of the lithium ion secondary batteries. The results are shown in Table 1.

As shown in Table 1, in Example 1, the IV resistance value was 2.7 mΩ. In addition, in Example 2, the IV resistance value was 2.8 mΩ. In addition, in Example 3, the IV resistance value was 3.1 mΩ. In addition, in Example 4, the IV resistance value was 3.2 mΩ. In addition, in Comparative Example 1, the IV resistance value was 2.6 mΩ. On the other hand, in Example 5, the IV resistance value was 4.7 mΩ which was slightly larger than in Examples 1 to 4 and Comparative Example 1. The reason for such results was speculated to be as follows.

Specifically, according to results of Examples 1 to 5, it was found that, as the coating 12 formed on the surface of the negative electrode active material particles 13 became thicker, the internal resistance (IV resistance) became larger in the lithium ion secondary battery produced using the negative electrode active material particles 13. This is thought to have been caused by the fact that, as the coating 12 became thicker, insertion and desorption of lithium ions in the negative electrode active material particles 13 become difficult. It is considered that therefore the IV resistance value was larger in Example 5 in which the thickness of the coating 12 made of graphite fluoride was larger than 110 nm than in Examples 1 to 4 in which the thickness of the coating 12 was 110 nm or less. According to the results, the thickness of the coating 12 made of graphite fluoride is more preferably 110 nm or less.

(Test of Penetration Thickness of Coating Solution)

In addition, regarding the negative electrode sheets of Examples 1 to 4 and Comparative Example 1, a penetration thickness of the coating solution 30 was examined. Here, the penetration thickness of the coating solution 30 refers to a thickness of the coating solution 30 applied to the surface of the film type negative electrode composite material 8 of the film type negative electrode composite material-attached current collector foil 9 in the coating process (Step S4) that has penetrated into the film type negative electrode composite material 8 (a penetration depth from the surface of the film type negative electrode composite material 8). Here, in this test, regarding the negative electrode sheets of Examples 1 to 4 and Comparative Example 1, a ratio of the maximum value T2 (maximum depth) of the penetration thickness of the coating solution 30 (the insulating layer 35) to the thickness T1 of the layer of the film type negative electrode composite material 8 (hereinafter referred to as a penetration thickness proportion)=(T2/T1)×100% was obtained (refer to FIG. 9). The results are shown in Table 2.

In addition, regarding Examples 1 to 4 and Comparative Example 1, a contact angle of the coating solution 30 was examined. Specifically, a contact angle of the coating solution 30 with respect to the surface of the film type negative electrode composite material 8 when the coating solution 30 was dripped onto the surface of the film type negative electrode composite material 8 of the film type negative electrode composite material-attached current collector foil 9 was measured. The results are shown in Table 2.

TABLE 2

| | Fluorination treatment | Contact angle (°) | Penetration thickness Proportion (%) | Determination |
|---|---|---|---|---|
| Example 1 | Yes | 100.2 | 7 | ○ |
| Example 2 | Yes | 123.5 | 3 | ○ |
| Example 3 | Yes | 150.4 | 1 | ○ |
| Example 4 | Yes | 170.5 | 0 | ○ |
| Comparative Example 1 | No | 80.3 | 60 | X |

As shown in Table 2, in Comparative Example 1, the penetration thickness proportion was 60%, and the coating solution 30 applied to the surface of the film type negative electrode composite material 8 penetrated to a depth of 60% of the entire thickness of the film type negative electrode composite material 8. On the other hand, in all of Examples 1 to 4, the penetration thickness proportion was less than 10%, and a thickness (depth) of the coating solution 30 penetrating into the film type negative electrode composite material 8 was significantly reduced compared to Comparative Example 1.

Specifically, in Example 1, the penetration thickness proportion was 7%, and the penetration thickness (depth) of the coating solution 30 applied to the surface of the film type negative electrode composite material 8 was reduced to a thickness (depth) of 7% with respect to the entire thickness of the film type negative electrode composite material 8. In addition, in Example 2, the penetration thickness proportion was 3%, and the penetration thickness (depth) of the coating solution 30 applied to the surface of the film type negative electrode composite material 8 was reduced to a thickness (depth) of 3% with respect to the entire thickness of the film type negative electrode composite material 8.

In addition, in Example 3, the penetration thickness proportion was 1%, and the penetration thickness (depth) of the coating solution 30 applied to the surface of the film type negative electrode composite material 8 was reduced to a thickness (depth) of 1% with respect to the entire thickness of the film type negative electrode composite material 8. In addition, in Example 4, the penetration thickness proportion was 0%, and penetration of the coating solution 30 applied to the surface of the film type negative electrode composite material 8 into the film type negative electrode composite material 8 was prevented. In this manner, in Examples 1 to 4, it was difficult for the coating solution 30 to penetrate (permeate) into the film type negative electrode composite material 8 compared to Comparative Example 1.

Further, the reason why it was difficult for the coating solution 30 to penetrate (permeate) into the film type negative electrode composite material 8 in Examples 1 to 4 was speculated to be as follows. Specifically, in Examples 1 to 4, as described above, in the fluorination treatment process (Step S1), when the surfaces of the negative electrode active material particles 13 were subjected to a fluorination treatment, the coating 12 made of graphite fluoride was formed on the surfaces of the negative electrode active material particles 13. In this manner, it is thought that, when the surfaces of the negative electrode active material particles 13 were covered with the coating 12 made of graphite fluoride, it was possible to impart high water repellency to the surface of the negative electrode active material particles 13.

In Examples 1 to 4, since the film type negative electrode composite material-attached current collector foil 9 was produced in the film forming process (Step S3) using the negative electrode composite material 6 containing the negative electrode active material particles 13 having such high water repellency, the surface of the produced film type negative electrode composite material 8 of the film type negative electrode composite material-attached current collector foil 9 had high water repellency. Therefore, it is thought that, in the coating process (Step S4), when the coating solution 30 containing the insulating particles 31, a binder, and water as a solvent was applied to the surface of the film type negative electrode composite material 8 of the film type negative electrode composite material-attached current collector foil 9, the coating solution 30 was easily repelled by the surface of the film type negative electrode composite material 8, and it was difficult for the coating solution 30 to penetrate (permeate) into the film type negative electrode composite material 8.

On the other hand, it is thought that, in Comparative Example 1, since the coating 12 made of graphite fluoride and having water repellency was not formed on the surfaces of the negative electrode active material particles 13, when the coating solution 30 was applied to the surface of the film type negative electrode composite material 8 of the film type negative electrode composite material-attached current collector foil 9, the coating solution 30 was not easily repelled by the surface of the film type negative electrode composite material 8 and the coating solution 30 easily penetrated (permeated) into the film type negative electrode composite material 8.

Here, a magnitude of the contact angle of the coating solution 30 with respect to the surface of the film type negative electrode composite material 8 was related to easiness of penetration (difficulty of penetration) of the coating solution 30 into the film type negative electrode composite material 8. Here, when the test results were studied, as shown in Table 2, in Comparative Example 1 in which the penetration thickness proportion increased to 60%, a contact angle of the coating solution 30 with respect to the surface of the film type negative electrode composite material 8 was 80.3°. On the other hand, in Examples 1 to 4 in which the penetration thickness proportion was reduced to less than 10%, a contact angle of the coating solution 30 with respect to the surface of the film type negative electrode composite material 8 was 100° or more.

According to these results, it can be understood that, in order to make it difficult for the coating solution 30 to penetrate into the film type negative electrode composite material 8, in the preceding fluorination treatment process (Step S1), surfaces of the negative electrode active material particles 13 were subjected to a fluorination treatment and the coating 12 made of graphite fluoride was formed on the surfaces of the negative electrode active material particles 13 so that a contact angle of the coating solution 30 with respect to the surface of the film type negative electrode composite material 8 was 100° or more, and in Step S2 (negative electrode composite material producing process), the fluorinated negative electrode active material particles 13, a binder, and water as a solvent were preferably mixed and granulated to produce the negative electrode composite material 6 made of the plurality of wet granules 16.

Here, among Examples 1 to 4, in Example 4 in which a contact angle of the coating solution 30 with respect to the surface of the film type negative electrode composite material 8 exceeded 160°, in the insulating layer 35 formed by drying the coating solution 30 in the drying process (Step S5), small parts (a part with a diameter of about 0.2 mm) in which the negative electrode mixture layer 18 could be seen through when the thickness was thinner than other parts were generated. This can be thought to be caused by the fact that a contact angle of the coating solution 30 with respect to the surface of the film type negative electrode composite material 8 was larger than 160°. Thus, more preferably, the surfaces of the negative electrode active material particles 13 are subjected to a fluorination treatment so that a contact angle of the coating solution 30 with respect to the surface of the film type negative electrode composite material 8 is 160° or less.

While the present disclosure has been described above with reference to the embodiments, the present disclosure is not limited to the embodiments, and appropriate modifications can be applied without departing from the spirit and scope of the disclosure.

What is claimed is:

1. A method of producing a negative electrode sheet comprising:
   forming a fluoride coating on surfaces of a plurality of negative electrode active material particles by performing a fluorination treatment on the surfaces of the plurality of negative electrode active material particles;
   producing a negative electrode composite material containing a plurality of wet granules obtained by mixing and granulating the plurality of negative electrode active material particles with the fluoride coating on the surfaces, a binder, and water as a solvent;
   causing the negative electrode composite material to pass through a gap between two rollers that face each other, compressing the negative electrode composite material into a film, and attaching the film to a surface of a current collector foil; and
   forming a negative electrode mixture layer on the surface of the current collector foil by drying the film on the surface of the current collector foil.

2. The method according to claim 1, wherein the plurality of negative electrode active material particles include graphite particles and the fluoride coating includes graphite fluoride.

3. The method according to claim 1, further comprising:
   after attaching the film to the surface of the current collector foil, before drying the film on the surface of the current collector foil, applying a coating solution containing insulating particles having electrical insulating properties, a binder, and water as a solvent to the surface of the film on the surface of the current collector foil,
   wherein, when the film on the surface of the current collector foil is dried, the film and the coating solution are dried such that the negative electrode mixture layer is formed on the surface of the current collector foil and an insulating layer in which the coating solution is dried is also formed on a surface of the negative electrode mixture layer.

4. The method according to claim 2, further comprising:
   after attaching the film to the surface of the current collector foil, before drying the film on the surface of the current collector foil, applying a coating solution containing insulating particles having electrical insulating properties, a binder, and water as a solvent to the surface of the film on the surface of the current collector foil,
   wherein, when the film on the surface of the current collector foil is dried, the film and the coating solution are dried such that the negative electrode mixture layer is formed on the surface of the current collector foil and an insulating layer in which the coating solution is dried is also formed on a surface of the negative electrode mixture layer.

5. The method according to claim 1, wherein, when the fluoride coating is formed on the surfaces of the plurality of negative electrode active material particles, a thickness of the fluoride coating is within a range of 50 nm to 110 nm.

6. The method according to claim 3, wherein the drying of the film on the surface of the current collector foil includes the following:
- heating the coating solution to 100° C.;
- after the coating solution is heated to 100° C., heating the film to 100° C. while the coating solution is maintained at 100° C.; and
- after the film is heated to 100° C., heating the coating solution and the film to 120° C.

7. The method according to claim 4, wherein the drying of the film on the surface of the current collector foil includes the following:
- heating the coating solution to 100° C.;
- after the coating solution is heated to 100° C., heating the film to 100° C. while the coating solution is maintained at 100° C.; and
- after the film is heated to 100° C., heating the coating solution and the film to 120° C.

* * * * *